United States Patent [19]
Bakker

[11] 3,966,886
[45] June 29, 1976

[54] METHOD OF PREPARING AND ISOLATING METAL HYDROCARBONYLS AND RECOVERY OF PURE METALS THEREFROM

[75] Inventor: Lubertus Bakker, Mentor, Ohio

[73] Assignee: Joseph P. Meyers, Palos Verdes, Calif. ; a part interest

[22] Filed: Dec. 29, 1971

[21] Appl. No.: 213,725

[52] U.S. Cl. ............................... 423/417; 423/418; 75/.5 BA; 148/105
[51] Int. Cl.² .......................................... C01G 1/04
[58] Field of Search ..................... 423/417, 418, 149

[56] References Cited
UNITED STATES PATENTS

| | | | |
|---|---|---|---|
| 2,767,048 | 10/1956 | Mertzweiller | 423/418 |
| 2,985,504 | 5/1961 | Orchin | 423/417 |
| 3,446,591 | 5/1969 | Pino et al. | 423/418 |
| 3,498,749 | 3/1970 | Aldridge | 423/149 |
| 3,595,965 | 7/1971 | Frantz et al. | 423/417 X |

FOREIGN PATENTS OR APPLICATIONS

| | | | |
|---|---|---|---|
| 504,454 | 7/1954 | Canada | 423/417 |

Primary Examiner—Earl C. Thomas

[57] ABSTRACT

This invention comprises a novel method for the preparation of metal hydrocarbonyls of metals of Groups 1b, 2b, 3b, 4b, 5b, 6b, 7b and 8 of the Periodic Table of the Elements and the attendant method for isolation of pure metals by the separation of a single metal as a metal hydrocarbonyl from any mixture and the subsequent decomposition of the metal hydrocarbonyl to metal powder. The methods of this invention are of particular value in recovering valuable metals in pure state from such sources as exhausted or poisoned metal-based catalysts, low grade ores, filter cakes or mining tailings. Gaseous metal hydrocarbonyl products of this invention also make possible isotope separation.

3 Claims, No Drawings

METHOD OF PREPARING AND ISOLATING METAL HYDROCARBONYLS AND RECOVERY OF PURE METALS THEREFROM

BACKGROUND OF THE INVENTION

The carbonyls of iron, nickel and cobalt have been the subjects of many patents covering both their preparation and their use. Such materials are usually prepared by reacting the pure metal or the metal sulfides, oxides, salts or esters with carbon monoxide, the latter reactions sometimes being effected in the presence of a reducing agent. See, for example, U.S. Pat. No. 2,473,993. Other known metal carbonyls include, for example, the various carbonyls of rhodium, tungsten, rhenium, osmium, iridium, molybdenum, ruthenium, chromium, vanadium and manganese as set forth on page 509 in Organometallic Chemistry, ACS Monograph No. 147, edited by H. Zeiss and published by Reinhold Publishing Corporation, New York, New York (1960). It appears that not all metals will form carbonyl derivatives. In addition, some metal carbonyls can only be formed from the pure metal while some metal carbonyls can only be formed from metal salts or esters. The very number of methods for preparing these compounds indicates the continuing search for improvement in such methods.

Known metal hydrocarbonyls include various hydrocarbonyls of chromium, molybdenum, tungsten, manganese, rhenium, iron, ruthenium, osmium, cobalt, rhodium, iridium and nickel as set forth on page 500 in Organometallic Chemistry supra. Cobalt hydrocarbonyl is described in U.S. Pat. No. 2,985,504 and is shown to be prepared by heating under pressure a mixture of cobalt octacarbonyl in a hydrocarbon solvent and carbon monoxide at pressure of about 1000 psig. at a temperature of about 110°C., then adding to the pressurized system hydrogen gas to a molar ratio of hydrogen to carbon monoxide of 2:1, and then cooling the system to −70°C. to produce a 70 percent yield of solid cobalt hydrocarbonyl. The prior art teaches the preparation of metal hydrocarbonyls starting with pure metal compounds to get pure metal products. Most prior art methods teach the use of such promoters or aids as copper and other catalysts, sulfur and certain hydrocarbons such as acetylene.

One of the principal objects of this invention is to provide a novel method for the preparation of pure metal hydrocarbonyls from impure starting products. Another object of this invention is to take advantage of the sensitivity to temperature and pressure of metal hydrocabonyls and to provide thereby a method of producing a pure metal powder from a metal oxide, metal sulfide, metal salt, metal ester and/or mixtures thereof by converting it or them to the corresponding metal hydrocarbonyl, isolating and reducing said metal hydrocarbonyl to pure metal while retrieving the hydrogen and carbon monoxide by-products. Another object is to provide a novel method for the separation of pure metals from mixtures of metals, metal oxides, metal sulfides, metals salts and/or metal esters by separately converting each of the mixture components which contain a given desired metal to the corresponding metal hydrocarbonyl, separating the hydrocarbonyl products from the reaction system by simple conventional methods, preferably by simply drawing off gaseous products or sifting out solid products, and reducing each of the separated products to its respective pure metal. A particular object is to provide a method for the extraction and recovery of cobalt metal and nickel metal from ferronickel-type alloys. These objects as well as others which are apparent from the following description are satisfied by this invention in its various aspects.

SUMMARY OF THE INVENTION

This invention comprises, first, a method comprising reacting a compound selected from the group consisting of a pure metal, a metal oxide, a metal sulfide, a metal salt, a metal ester and mixtures thereof, said metals being limited to certain groups stated below, with a mixture of hydrogen and carbon monoxide in a molar ratio of from 3:1 to 1:3, preferably 2:1 to 1:2, at a temperature from 0° to 500°C., preferably from about 50° to 300°C., and an absolute pressure of from one to 700 atmospheres at a temperature and pressure and for a time sufficient to produce metal hydrocarbonyls. This reaction can be conducted in dry state whereby gaseous, liquid or solid products are produced and removed or this reaction can be conducted in a solvent for either the reactant metal compound or the desired product, preferably the latter, again to make possible separation of the product from the system. After separation from the system, the products can be isolated by reducing their temperature while under pressure to a point below the freezing or crystallization point. Alternatively, the products can be immediately reduced to metal powder by reducing or increasing the temperature as described further below. As a still further alternative, if the product comprises a mixture of metals as metal carbonyls and/or metal hydrocarbonyls, the various components can be separated by conventional methods such as distillation, crystallization, extraction and the like. This is true even if there is a mixture of isotopes of a single metal in the starting material.

The methods comprising this invention are notably useful with metals from Groups 1b, 2b, 3b, 4b, 5b, 6b, 7b and 8 of the Periodic Table of the Elements as set forth inside the back cover of the Handbook of Chemistry and Physics, 45th Edition, with particular emphasis on Groups 1b, 6b, 8 and the element mercury.

DESCRIPTION OF THE PREFERRED EMBODIMENTS

It has been found that a mixture of carbon monoxide and hydrogen in molar ratios ranging from 2:1 to 1:2, sometimes referred to as "synthesis gas", under pressure up to 700 atmospheres and over and temperatures up to 500°C. and over attack reduced metals as well as metal compounds such as metal oxides, metal sulfides, metal salts and metal esters to form metal hydrocarbonyls. The term metal salts is intended to include all compounds in which the metal is chemically bonded to one or more inorganic substituents, the commonest of such substituents being halogen atoms, nitrate groups and sulfate groups. The term can also be held to read on the metal sulfides which are recited and considered separately herein and compounds such as metal nitrides and even mixed metal compounds such as metal phosphates. The term metal esters includes primarily metal esters of carboxylic acids. The most significant point is that metal hydrocarbonyls can be produced from relatively common metal compounds rather than only from exotic unstable compounds like the metal carbonyls.

The metals of particular interest in this invention are the metals of Groups 1b, 6b, 8 and the element mercury of the Periodic Table of the Elements, especially copper, silver, gold, mercury, iron, cobalt, nickel, rhodium, palladium, iridium and platinum. Of these metals the hydrocarbonyls of iron, cobalt, nickel, rhodium and iridium are known.

The method of this invention comprises, first, a simple reaction under controlled conditions. A metal-containing feed material is placed in a vessel which is closed and preferably evacuated after which a gas mixture of carbon monoxide and hydrogen is introduced under pressure, the mol ratio of carbon monoxide to hydrogen in said gas mixture ranging from about 2:1 to about 1:2 and being preferably about 1:1. The system is heated at a given initiation temperature for a time sufficient to cause the complete reaction of one of the metals in the feed material to form the corresponding metal hydrocarbonyl which is then removed from the reaction system. The method of this invention also preferably comprises, second, a decomposition step whereby the temperature is raised or lowered and the pressure is also varied, if desired, and the metal hydrocarbonyl decomposes to pure metal powder, carbon monoxide and hydrogen.

In the reaction step of this invention the temperature can range from room temperature, i.e. 20°C., up to 500°C. and over, but it appears that the range of about 50°C. to about 300°C. covers the initiation temperatures for the preparation of the desired metal hydrocarbonyls. For a given metal the initiation temperature is determined by heating a corresponding metal compound or the metal itself under pressure with the carbon monoxide-hydrogen gas mixture for periods of no more than about two hours at various increasing levels of temperature. Initiation of the reaction is marked by a significant exotherm creating a short-lived but substantial rise in the temperature of the system. Initiation of the reaction appears to take place for any given metal or metal compound in no more than two hours at or above the initiation temperature for that metal. Consequently, with an unknown feed material the system can be put under an absolute pressure of, for example, about 1500 p.s.i. and heated at some beginning temperature such as 50°C. until a sudden exotherm indicates initiation of a reaction. If there has been no such exotherm after two hours, the temperature is raised to a second level, such as 100°C. and maintained there for up to two hours to permit any reaction initiation which might take place. The stepwise heating continues until a reaction is initiated.

Once a reaction initiates, it is continued until all of the particular metal involved in the reaction is consumed out of the feed material. If the optimum initiation temperature is not known, the temperature of the system after initiation should be raised and lowered by small increments for finite time periods to determine if more hydrocarbonyl product can be produced indicating the optimum initiation temperature. It is probable that at the optimum initiation temperature most of the conversion to metal hydrocarbonyl takes place within the first two to five minutes after initiation of the reaction, but generally about 12, 16 or even 24 hours of heating may be required to complete the reaction of one metal although this time may be significantly reduced by the use of a stirred, rotating or fluid bed reactor to insure maximum intimate contact.

The minimum pressure in the reactor is controlled, first, by the quantities of carbon monoxide and hydrogen necessary for essentially complete reaction. Because the major hydrocarbonyl formation for any metal takes place immediately after initiation of the reaction it is highly desirable although not necessary to have sufficient carbon monoxide and hydrogen present to complete a given hydrocarbonyl formation for a given metal. The second consideration for system pressure is the stability of the metal hydrocarbonyl being formed at the temperature of reaction. This pressure can vary considerably but undoubtedly needs to be no greater than about 700 atmospheres. Preferably, the pressure of the system is maintained at no more than about 250 atmospheres, more preferably in the range of 15 to 150 atmospheres or about 220 to 2200 p.s.i. The higher pressures should increase the efficiency of any given metal hydrocarbonyl formation. Whether the hydrocarbonyl products are solids, liquids or gases, the hydrocabonyl-forming reaction results in decreasing pressure in the system so that synthesis gas must be added continually to maintain a given system pressure after initiation of a metal hydrocarbonyl-forming reaction.

It is noteworthy that the pressure of the reaction system has a small but noticeable effect on the initiation temperature for a given metal hydrocarbonyl-forming reaction, a change from 50 to 5000 p.s.i. causing a maximum variation in a given initiation temperature of about 15°C. Consequently, care must be taken to find the optimum initiation temperature for hydrocarbonyl formation with a given metal under given pressure conditions.

At a system pressure of 1500 p.s.i., the optimum initiation temperatures for the formation of cobalt, nickel and iron hydrocarbonyls are about 95°C., 185°C. and 225°–230°C. respectively.

Each metal hydrocarbonyl formation reaction is an equilibrium reaction which is primarily dependent on temperature, the optimum temperature being determined by experimentation. At any given pressure the better the temperature control, the more efficient and complete is the desired reaction. The optimum reaction temperature is generally about 5° to 15°C. above the minimum practical initiation temperature. Consequently, where the metals in the feed material are known, it is preferable to heat the system under the carbon monoxide-hydrogen pressure to the lowest optimum temperature for the various possible hydrocarbonyl formation reactions for the different metals present. Later decomposition of each separated product can then be readily accomplished by heating or cooling the product any amount, preferably at least 25° to 50°C. If a given metal hydrocarbonyl is being produced at less than the optimum temperature, the product can be decomposed by reducing the temperature, preferably at least 25° to 50°C., or by raising the temperature to at least 25° to 50°C. above the optimum temperature for the formation of the particular metal hydrocarbonyl. On the other hand, if a given metal hydrocarbonyl is being produced at higher than the optimum temperature, the product can be decomposed by raising the temperature, preferably at least 25° to 50°C., or by lowering the temperature to at most 25° to 50°C. below the optimum temperature.

If the hydrocarbonyl product of a certain metal is a gas, it can be vented into another container together with unreacted carbon monoxide and hydrogen. The desired metal hydrocarbonyl product can then be recovered by such standard techniques as preferential diffusion, absorption or by formation of some complex, such as an amine complex, which might be more readily separable from a gas mixture. However, for the purposes of this invention, it is preferable that the mixture of carbon monoxide, hydrogen and gaseous metal hydrocarbonyl product be vented at pressure and temperature conditions which decompose the metal hydrocarbonyl to pure metal, which precipitates as a powder, and hydrogen and carbon monoxide, which can be recycled. This venting can be done most easily at room temperature (20°C.) and atmospheric pressure, but it is more efficient simply to raise or lower the temperature as described above only enough to cause decomposition of the hydrocarbonyl product so that the carbon monoxide and hydrogen produced by the decomposition of the metal hydrocarbonyl are still under the substantial ambient pressure. By use of such simultaneous removal and decomposition of a given metal hydrocarbonyl as it is formed, it is possible to exhaust a given metal from a feed material simply by continuing the formation reaction, product removal and product decomposition conditions until no further metal precipitates.

If the particular metal hydrocarbonyl being produced is a solid product, the product is a fluffy soft solid which can be separated from the denser feed material by a centrifuge or a sieve of such dimension that the dense powdered feed material will pass through but the product will be retained. A solid product is separated from the feed material and transferred from the reaction vessel to another vessel at the same temperature and pressure before decomposing the product and recovering the pure metal which then precipitates from the sieve screen on which the product is carried. Alternatively, a solid product can be reacted with some complexing compound such as ammonia or a lower organic amine to form a new complex product which may be more readily separable than the metal hydrocarbonyl itself after which the complex can be decomposed.

Liquid products can be separated, for example, by distillation, crystallization, azeotropic distillation or extraction or by the formation of a more readily separable complex compound as described for the solid products.

It is expected that the hydrocarbonyls of copper and chromium are gaseous products under the conditions of reaction herein, as are the hydrocarbonyls or iron, cobalt and molybedenum and that the hydrocarbonyls of silver, gold, mercury, rhenium, palladium, iridium and platinum are solid products under the conditions of reaction herein, but this invention is not intended to be limited by these predictions.

Usually the feed materials employed in this invention are solids. Since the hydrocarbonyl formation reaction is a surface phenomenon, it is preferable that the feed material have a maximum surface area which is made possible by use of minimum particle size feed materials. Thus, while the subject reaction will take place with coarse solids having maximum dimension of 1 mm. and over (U.S. Sieve No. 18 or less), it is preferable that the starting materials have a maximum particle dimension of no more than about 0.1 mm. (U.S. Sieve No. 60 or higher), more preferably less than 0.002 mm. (U.S. Sieve No. 270 or higher). If the feed materials are liquids or suspended in liquids, it is preferable that this liquids be recycled through a spray or otherwise agitated to give maximum time and surface contact between feed materials and carbon monoxide - hydrogen synthesis gas.

The methods of this invention are useful for the preparation of the defined metal hydrocarbonyls without the presence of catalysts and hydrocarbons and for the easy and complete separation of pure metals out of any mixture of metals and metal compounds. This method also makes possible the separation of cobalt isotopes by gas diffusion techniques employed on the gaseous cobalt hydrocarbonyls. The metal hydrocarbonyls, especially cobalt hydrocarbonyl, are useful as catalysts for systems in which there are no critical changes in temperature and pressure as in the oxo process, the synol process (direct synthesis of alcohols) and the Fischer-Tropsch process.

The best methods of practicing this invention are set forth above. The following examples are specific illustrations of work done to date to assist in understanding the subject invention.

EXAMPLE I

A molybdenum ore concentrate containing 5–10% molybdenum sulfide as well as other materials was charged to a reaction vessel capable of withstanding high pressures and elevated temperatures. It is best the ore is finely divided, i.e., no larger than about 325 mesh U.S. Sieve Series. The vessel was charged with synthesis gas (an equimolar mixture of hydrogen and carbon monoxide) and heated to a temperature of 200°C. and a pressure of 10,000 psi. In this way, the hydrocarbonyl and small quantities of carbonyl were formed. The reaction may be carried out batchwise or continuously. The carbonyl-hydrocarbonyl mixture was vented while keeping the pressure constant. Liquid carbonyls were separated from the gaseous hydrocarbonyls. Both the carbonyl and the hydrocarbonyl were decomposed by lowering the pressure to yield pure molybdenum metal powder. The molybdenum metal powder can be used as such or oxidized to $MoO_3$. The carbon monoxide and hydrogen gases were returned to the system with fresh synthesis gas.

An alternate route is to convert the molybdenum sulfide into the chloride and to proceed from there in much the same way. Still another route is to roast the sulfide to the oxide and to either convert the oxide into the molybdenum hydrocarbonyl or to reduce the metal oxide to the metal which is then extracted from the ore as a hydrocarbonyl and decomposed to a powder by reducing the pressure and temperature.

EXAMPLE II

As another example of the invention, an ore containing nickel, iron, copper, sulfur and cobalt was treated as follows. The first step was to granulate the ore to 325 mesh (U.S. Sieve Series) and react it with a nitric acid - nitrous oxide mixture at about 60°C. in a closed vessel with stirring. The escaping gases which were nitrous oxides were vented, collected, mixed with air and returned to the reaction vessel. The advantage in this process was the air mixing with the nitrous oxides which saves considerably on nitric acid. Compare this with the conventional method which uses oxygen for oxidation followed by reduction at high temperatures.

In the above process, the $NO_2$ oxidized the sulfides together with the oxygen and NO was vented as aforementioned. There was thus produced a mixture of nitrates of nickel, iron, copper and cobalt which could be filtered. Compare this with prior art oxygen furnace runs at some 2000°F.

The next step in the process of the invention was to precipitate the nitrates to metal hydroxides with ammonia. The hydroxides were then dried and reduced with hydrogen or a mixture of hydrogen and methane to yield an admixture of reduced metals in concentrated form. Next a reactor was charged under a suitable temperature of about 110°C. and pressure of 200–300 atmospheres to form cobalt hydrocarbonyls and a minor proportion of cobalt carbonyls.

The hydrocarbonyls and carbonyls were vented keeping up the pressure. The mixture of cobalt hydrocarbonyls and cobalt carbonyls was then cooled to deposit cobalt.

The precipitated cobalt is pure and free from nickel and iron. Next the nickel and iron hydrocarbonyls and carbonyls were prepared in order at 185°C. for nickel and at 225°C. for iron, were vented off as they were made and were decomposed to separate pure metallic powders by lowering the temperature and pressure. The copper left behind was pure as the removal of cobalt, nickel and iron was complete. Thus, copper, cobalt, nickel and iron in an ore in compound form were successfully separated and converted into pure metals.

EXAMPLE III

In accordance with another example of the invention, a cobalt ore containing cobalt sulfide was employed. The first step was to divide the ore finely. Next, the cobalt sulfide was roasted to cobalt oxide. The cobalt oxide-containing ore was then charged to a reaction vessel capable of withstanding high pressure and elevated temperatures. The vessel was charged with synthesis gas (an equimolar mixture of hydrogen and carbon monoxide) and heated to a temperature of 200°C. and a pressure of 5000 psi. The molar ratio of hydrogen to carbon monoxide may vary from ⅓ to 3/1. The foregoing process resulted in the formation of cobalt hydrocarbonyl. This hydrocarbonyl was reduced to powdered cobalt metal form by reducing the temperature to −26°C. and the pressure to atmospheric.

EXAMPLE IV

Ferro nickel is ground to a 300 mesh powder (U.S. Sieve Series) and reacted with synthesis gas for 24 hours at 1500 psi and 195°C. After equilibrium is reached, the reactor is slowly vented at a rate of 3 cubic feet per minute of gas per 100 grams of ferro nickel, keeping the temperature and pressure constant in the reactor with the addition of fresh synthesis gas, into a receptacle at room temperature and atmospheric pressure where about 80% of the cobalt in the ferro nickel is recovered as metal powder.

EXAMPLE V

Nickel linoleate was reacted with synthesis gas for 12 hours at 1500 psi and 195°C. After 12 hours when equilibrium had been reached, the reactor was slowly vented at 3 cubic feet per minute of gas per 100 grams of nickel linoleate, keeping the temperature and pressure constant in the reaction vessel with the addition of fresh synthesis gas, into a receptacle at room temperature and pressure where all the nickel was recovered as a 325 mesh (U.S. Sieve Series) powder.

EXAMPLE VI

Four 333 gram samples of 300 mesh (U.S. Sieve Series) laterite ore containing 3.05 weight percent nickel were reacted with synthesis gas at 1500 psi and 195°C. for the time periods shown below. The resulting gas was then vented at a rate of 3 cubic feet per minute for the times shown into a receptacle, pressure being maintained in the reaction vessel by the introduction of additional synthesis gas. The weight loss in the starting material was recorded in each case, said weight loss representing all the nickel and water present in the ore samples.

TABLE

| Run | Reaction Time (hrs.) | Vent Time (hrs.) | Weight loss (gms.) |
|-----|---------------------|------------------|--------------------|
| A | 4 | 4 | 28.27 |
| B | 4 | 6 | 29.78 |
| C | 6 | 4 | 29.18 |
| D | 6 | 6 | 27.73 |

EXAMPLE VII

The procedure of Example VI was repeated on two 50 gram samples of 300 mesh water-free nickel oxide ($Ni_2O_3$) with the following results.

TABLE

| Run | Reaction Time (hrs.) | Vent Time (hrs.) | Weight loss (gms.) |
|-----|---------------------|------------------|--------------------|
| E | 4 | 4 | 16.48 |
| F | 4 | 6 | 21.72 |

EXAMPLE VIII

Four samples of 300 mesh (U.S. Sieve Series) ore containing 7.5 weight percent nickel were reacted in the amounts shown in the Table with synthesis gas for the time shown at 1500 psi and 195°C. The gas in each run was then vented at 3 cubic feet per minute for the time shown into a receptacle at room temperature and pressure, pressure being maintained in the reaction vessel by the introduction of new synthesis gas.

TABLE

| Run | Ore Weight (gms.) | Reaction Time (hrs.) | Vent Time (hrs.) |
|-----|-------------------|---------------------|------------------|
| G | 274.09 | 8 | 4 |
| H | 293.06 | 12 | 4 |
| I | 273.00 | 8 | 6 |
| J | 259.92 | 12 | 6 |

No product appeared in the receptacle in any run. The solid reaction product left in the reaction vessel in each run was sieved in each case about 80 weight percent being over 80 mesh (U.S. Sieve Series) and the remainder being nickel-free ore. This shows first, that with some types of ore there may be intermediate formation of nickel hydrocarbonyls with other nickel complexes and possibly with other metal complexes and, second, that notwithstanding such intermediate formations the method of this invention can and does separate metal from ore. The resulting nickel-containing product can be readily reprocessed by the method of this invention to isolate the gaseous nickel hydrocarbonyl produced, for example, in Examples V, VI and VII.

Another process is considered to offer distinct advantages especially that of being a continuous process.

This process entails the suspension of finely-ground feed material in an inert liquid such as a paraffin oil and movement of the resulting slurry at a suitable temperature and pressure through at least one, preferably two, vertical reactors. The metal hydrocarbonyl which is formed as a gas dissolves at least in part in the inert liquid from which is filtered unreacted feed material. The filtered liquid is then passed into another receptacle in which the pressure and usually the temperature is lowered, and the dissolved metal hydrocarbonyl decomposes into metal which is filtered and into the gas components which can be recycled with the inert liquid. This process can be used for nearly all gaseous and liquid forms of metal hydrocarbonyls.

For example, paraffin oil is mixed with a powdered nickel-bearing ore in a weight ratio of 10:1. The resulting slurry passes through two reactors, each four inches in internal diameter and 33 feet in length, under a synthesis gas pressure of 1500 psi at 195°C. at a rate to allow a reaction time of 2 hours. At the end of the second reactor the liquid is filtered and fed into a vessel at atmospheric pressure and room temperature. The nickel powder which precipitates is filtered out, and the oil and gases are recycled.

I claim:
1. A method comprising
   1. contacting a solid material having a maximum particle dimension of 1 mm. and containing nickel present as any of free metal, metal oxides, metal sulfides, metal salts, metal esters and mixtures thereof with a mixture of hydrogen and oxygen in a molar ratio of from 3:1 to 1:3 at a temperature of 185° ±15°C. and a pressure of from one to about 250 atmospheres for a time sufficient to convert substantially all of said nickel in said solid material to nickel hydrocarbonyl, and
   2. separating such nickel hydrocarbonyl from the reacting system while maintaining said system at said temperature and pressure.

2. A method in accordance with claim 1 wherein said absolute pressure is in the range of 15 to 150 atmospheres.

3. A method in accordance with claim 1 wherein said solid material is substantially free of cobalt in any form.

* * * * *

UNITED STATES PATENT OFFICE
CERTIFICATE OF CORRECTION

Patent No. 3,966,886  Dated June 29, 1976

Inventor(s) Lubertus Bakker

It is certified that error appears in the above-identified patent and that said Letters Patent are hereby corrected as shown below:

Column 10, line 9, "oxygen" should read -- carbon monoxide --

Signed and Sealed this

Twenty-sixth Day of October 1976

[SEAL]

Attest:

RUTH C. MASON
*Attesting Officer*

C. MARSHALL DANN
*Commissioner of Patents and Trademarks*